3,132,186
OLEFIN POLYMERIZATION PROCESS
Raymond N. Fleck, Whittier, Carlyle G. Wight, Fullerton, and William L. Wasley, Santa Ana, Calif., assignors to Union Oil Company of California, Los Angeles, Calif., a corporation of California
Filed July 29, 1957, Ser. No. 674,671
2 Claims. (Cl. 260—654)

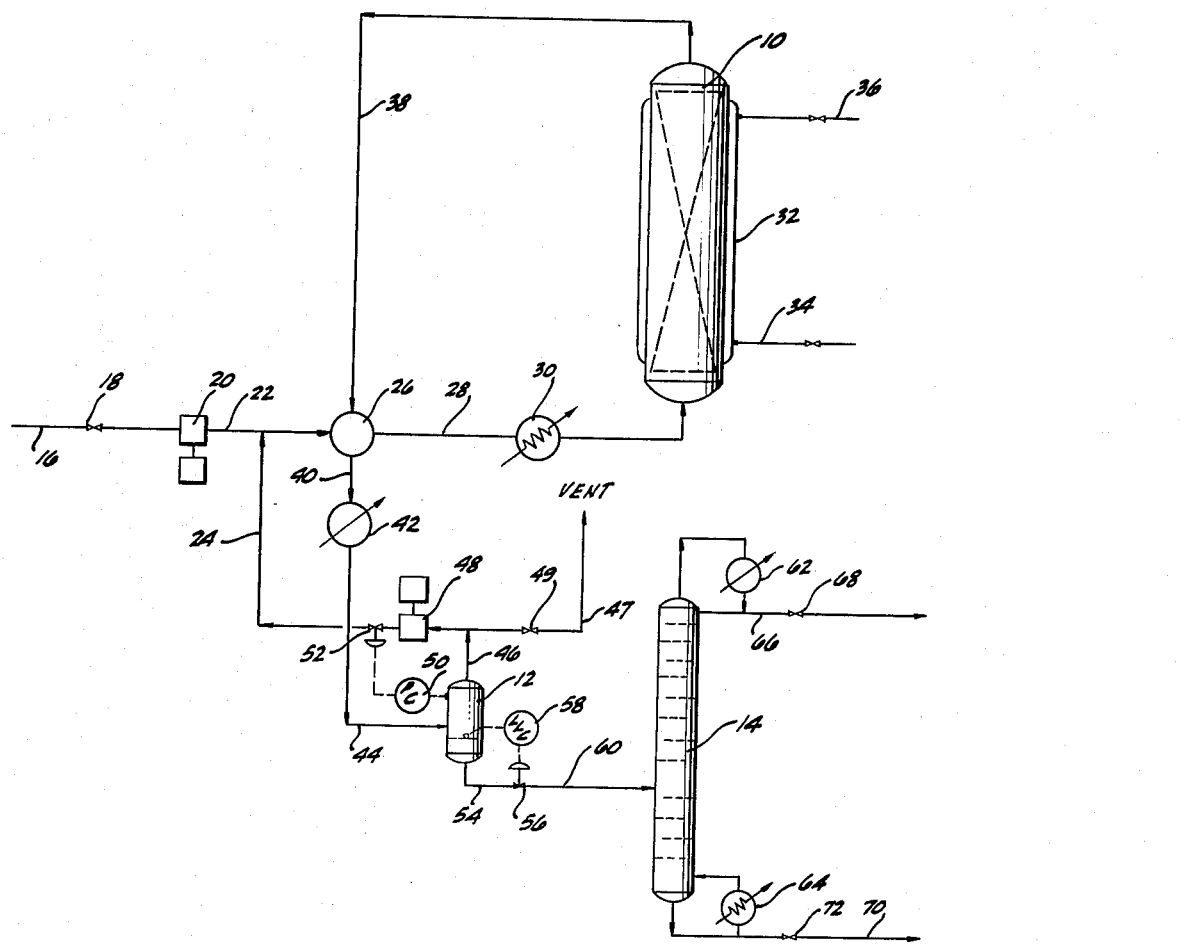

This invention relates to the polymerization of vinyl compounds, and in particular relates to a low pressure, low temperature process for the dimerization of olefin hydrocarbons such as isobutylene, and the like.

The production of relatively low molecular weight hydrocarbon polymers, such as the dimers of olefins such as isobutylene, is important in the production of highly branched hydrocarbons boiling in the gasoline boiling range and having exceedingly high antiknock ratings. For example, the dimers of isobutylene are highly branched octenes which may be hydrogenated rather readily to produce the iso-octane of commerce. Furthermore, these polymers are excellent solvents in many cases. The dimers and trimers and even the tetramers of such olefin hydrocarbons are advantageous in the manufacture of synthetic detergents. The higher polymers of these olefin hydrocarbons produce lubricating oil fractions of exceedingly high viscosity index, frequently well over 100. The still higher polymers are waxy solids and constitute synthetic resins.

In the past, olefin hydrocarbons of the isobutylene type have been polymerized thermally, frequently directly after their formation in a thermal cracking process, by maintaining them at temperatures in the range of 700° F. to 1250° F. and under pressures of from about 500 p.s.i. to 5000 p.s.i. The prior art processes involving catalytic polymerization of isobutylene and similar olefins are rather numerous. Possibly the earliest catalyst suggested for this purpose was syrupy phosphoric acid supported on a solid carrier such as kieselguhr, and this was employed at about 600 p.s.i. and 325° F. to produce isobutylene polymers. Sixty-five percent sulfuric acid maintained at between 70° and 105° F. and from 0 to 100 p.s.i.g. also will catalyze the isobutylene polymerization. Boron trifluoride at temperatures from 250° to 350° F. is also effective. Aluminum chloride and hydrogen chloride will also catalyze the reaction. Other catalysts which have been suggested include copper pyrophosphate; the sodium, lithium, potassium, and barium chloro-aluminates; the calcium, magnesium, barium, strontium, sodium, and potassium phosphates at 250° F. to 550° F., the synthetic silica-alumina Houdry cracking catalysts at 50–700° F. and 100 p.s.i.; the various aluminum halide double salts with other metals such as lithium, sodium, copper, antimony, and mercury used at 200° F. to 500° F. and at pressures of 200 to 1000 p.s.i.; and others.

The various disadvantages of these above-mentioned processes and catalysts are believed to be obvious. The thermal polymerization processes operate at extreme conditions of temperature and pressure and therefore the necessary equipment to generate and maintain these conditions is very expensive. Furthermore, these thermal processes are relatively nonselective in the polymers which are produced and many individual polymers occur in admixture with each other in the effluent. The catalytic reactions tend to be more selective and produce somewhat simpler mixtures of polymers, but they are still relatively complex. They do however operate at less extreme conditions, but this is at the expense of the provision and maintenance and recovery of a catalyst in the system.

It is therefore an object of the present invention to provide a simple process operating at very moderate conditions of temperature and pressure in the presence of a specific adsorptive solid contact material whereby vinyl compounds may be selectively polymerized into higher molecular weight products.

It is also an object of this invention to avoid the extreme temperature and pressure conditions of thermal polymerization processes and the catalyst maintenance and recovery problems associated with the prior art catalytic polymerization processes.

It is a more specific object of this invention to provide a novel process for the selective polymerization of isobutylene into its dimers and trimers at very high degrees of conversion and yield and at very low pressures and moderate temperatures.

It is also an object of this invention to provide an apparatus adapted to effect the foregoing objects.

Other objects and advantages of the present invention will become apparent to those skilled in the art as the description and illustration thereof proceed.

Briefly, the present invention comprises a process for vinyl compound polymerization, particularly isobutylene dimerization, in which a gas containing the vinyl compound is contacted with a particular solid zeolitic metallo alumino silicate adsorbent at pressures on the order of about atmospheric and at temperatures on the order of about 280° F. to convert the vinyl compound into relatively low molecular weight polymers, principally dimers. In the case of isobutylene and the specific conditions mentioned above, a conversion of about 50% of the olefin per pass into a liquid containing about 65% by volume dimer and about 35% by volume trimer is obtained at a yield of over 85%.

The process of the present invention will be described below in greater detail in terms of the dimerization of isobutylene to produce a dimer and trimer practically exclusively. This is not to be considered as a limitation, since various other vinyl compounds are shown to dimerize in this process. The isobutylene dimerization is thus illustrative only.

The olefin-containing gas, such as an isobutylene-rich fraction produced by fractionation of hydrocarbon cracking plant effluents, is passed in the vapor phase in contact with a particular solid granular contact material, namely certain zeolitic metallo alumino silicates hereinafter more particularly described. Since the process does not appear to require continuous or periodic regeneration of the contact material, the contact material may be maintained as a static bed of solids through which the feed gas passes. This is not to preclude the use of a moving bed of solids or the use of fluidized bodies of powdered or pulverized solids according to the methods well known in the art.

The olefin is preferably contained in the feed gas at concentrations on the order of 50% or greater, but dilute feed gases containing the olefine in concentrations as low as about 5% by volume can be employed. The temperature of the feed gas and of the solid contact material may be maintained at values between about 0° F. and 500° F. and preferably the temperature is maintained between about 150° F. and 350° F. High yields of isobutylene dimer and trimer are obtained at contacting temperatures of about 280° F. The operating pressure may range from subatmospheric to superatmospheric pressures as high as about 100 p.s.i. However, nominal pressures on the order of atmospheric pressures are adequate for the process of this invention.

The reaction time, or more properly the time that the olefin feed is exposed to the action of the solid contact material, is perhaps best expressed in terms of volumes of the olefin feed per volume of the bulk solid contact material mass per hour (v./v./hr.). The contact time may be varied at values between about 0.1 and about 10 v./v./hr. The conversions per pass of isobutylene range under these conditions between about 35 and 75% and the yields on a weight basis of the dimers and trimers of isobutylene range between about 75 and about 95%.

The foregoing conditions of operation have been outlined independently of the description of the process itself which is illustrated and best described in conjunction with the attached drawing which shows a schematic process flow diagram of the process of this invention using a static bed of granular solid contact material. The description of the drawing also will be conducted in terms of isobutylene dimerization for sake of simplicity. The other various vinyl compounds which also may be polymerized according to the principles of this invention are illustrated subsequently by way of specific examples.

Referring now more particularly to the drawing, the essential equipment items employed include reactor 10, vapor liquid separator 12, and liquid product fractionator 14. The feed stream consisting of a commercial isobutylene stream has the following composition.

TABLE 1

*Feed Composition*

| Components: | Mol percent |
|---|---|
| Propane and lighter | 0.7 |
| Normal isobutane | 0.9 |
| Normal butane | 4.6 |
| Normal butene | 5.3 |
| Isobutylene | 88.1 |
| $C_5$ and heavier | 0.4 |
| | 100 |

This material is introduced through line 16 at a rate controlled by valve 18 and is raised to the desired operating pressure by means of compressor 20. In this case the pressure was a nominal 10 p.s.i.g. The compressor effluent is discharged through line 22 and is combined with circulated unreacted isobutylene flowing through line 24. The mixed isobutylene feed passes through feed product exchanger 26 wherein the reactor effluent is heat exchanged with the reactor feed. The feed stream is in this manner preheated to approximately 220° F. while the reactor effluent cools to about 200° F. The preheated feed continues through line 28 and passes through feed heater 30 in which the feedstock is raised to about 280° F. The feed then passes upwardly through reactor 10 in direct contact with a mass of a zeolitic metallo alumino silicate adsorbent having substantially uniform intracrystalline pores about 5 A. in diameter. If desired, the feed stream may pass downwardly through this bed of contact solids. Reactor vessel 10 is provided with a jacket 32 by means of which the exothermic heat of polymerization is partly dissipated through circulation of a coolant therethrough by means of lines 34 and 36. If desired additional heat exchange equipment such as tubes or coils submerged in the solids bed may be employed according to well known prior art procedures.

The reactor effluent discharges at a temperature of about 325° F. through line 38 and is cooled in exchanger 26 in which the feed stream is initially preheated. The partially cooled effluent continues through line 40 into cooler 42 and is then discharged through line 44 into vapor liquid separator 12. Herein, at a temperature of about 100° F., the dimer and trimer of the isobutylene feed is condensed into the liquid phase. The uncondensed material consists essentially of unreacted isobutylene. The major part of this material is removed through line 46 and recirculated by means of compressor 48 and line 24 through reactor 10 with additional fresh feed. The remainder is bled off through line 47 at a rate controlled by valve 49 to remove inerts. Pressure controller 50 and control valve 52 maintain the isobutylene recycle stream at the proper flow rate.

The condensed isobutylene polymers are removed through line 54 at a rate controlled by valve 56 and liquid level controller 58. This material is introduced through line 60 into polymer fractionator 14. This fractionator is provided with overhead condenser 62 and bottoms reboiler 64. The overhead product, part of which is employed as column reflux, consists of the isobutylene dimer and this is removed through line 66 at a rate controlled by valve 68. The composition of the dimer by volume is 79% 2,4,4-trimethylpentene-1 and 21% 2,4,4-trimethylpentene-2. This dimer amounts to about 65% by volume of the liquid product charged to column 14.

The isobutylene trimer is removed from the bottom of column 14 through line 70 at a rate controlled by valve 72. Analysis of this stream has indicated that it contains very little higher molecular weight products. The process described above is characterized by a 50% conversion per pass of the isobutylene introduced and of the isobutylene which reacts, 85% produces the isobutylene dimer and trimer.

In order to illustrate the several other vinyl compounds which may be polymerized according to the process of the present invention, the following data are given.

STYRENE FEED

Commercial styrene, about 95% pure, was passed at atmospheric pressure over the 5 A. zeolitic silicate solids at a temperature of approximately 482° F. The effluent was cooled and condensed, distillation separated the dimer at a rate equivalent to 21% conversion. The unreacted styrene amounted to 78% of the feed and it was recycled.

VINYL CHLORIDE FEED

Vinyl chloride was passed at 482° F. through the 5 A. zeolitic silicate at atmospheric pressure yielding an effluent containing the dimerized product at 32% conversion. Vinyl bromide reacts analogously.

The preferred temperature range for styrene and the vinyl halides is between about 200° F. and about 500° F.

The 5 A. silicate was very effective in producing the dimers and some trimers of these vinyl monomer compounds. Virtually the same degrees of conversion and yield were obtained with the isobutylene, styrene, and vinyl chloride feeds when zeolitic silicates having pore diameter of 4 A., 10 A., and 13 A. were employed. The compositions of these silicates are given below. However, a similar zeolitic silicate having 3 A. pores and a composition corresponding substantially to

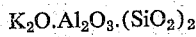

$$K_2O.Al_2O_3.(SiO_2)_2$$

did not function to produce the dimers or any higher polymer from these same materials. The feed stream passes unchanged through contact with this solid material.

The adsorbent zeolitic solid contact material employed in the process of this invention is a solid granular material having a mesh size range between about 2 and 100 mesh and preferably between about 4 and about 30 mesh. It is used in the form of a dense compact bed of material through which the reactant streams pass, either in the vapor phase or in the liquid phase. The process may employ the solid material in the form of a single static bed of material in which case the processes is only semicontinuous. If desired a plurality of two or more static beds of adsorbent may be employed with the feed stream passing through the reactors in series or parallel. The feed and product flows are continuous, in either the vapor or liquid phase, and either up or down through the adsorbent. The mechanical apparatus employed in static bed contact with the reactant stream is conventional and well known to those skilled in the art.

The moving solids bed modification referred to above may be employed in those situations where solids regeneration is desired. The flow of feed is maintained continuously through a reaction zone and a suitable regeneration fluid is maintained continuously through a regeneration zone, the granular adsorbent being recirculated successively through these two zones. With the smaller sized mesh ranges of the solids, i.e., the powdered solids, the material may be fluidized in and by the fluid streams contacting it. The necessary apparatus is also conventional and well known to those skilled in the art. The compact bed modifications are preferred since a greater number of theoretical and actual contact stages are more readily obtained in smaller and simpler equipment. Accordingly this modification was illustrated above.

The present invention may be carried out only with a restricted kind of solid granular contact material. The only effective materials which may be used in the present invention are the natural or synthetic crystalline partially dehydrated zeolitic metallo alumino silicates having pore diameters of at least about 4 A. The composition of one typical synthetic zeolite having a pore size of about 4 A. is $[Na_2O.Al_2O_3.(SiO_2)_2]$. It may be prepared by heating essentially stoichiometric quantities of alumina and silica with excess caustic under pressure. The excess is washed out to produce the hydrous gel, and the adsorbent is then activated by partial dehydration. It functions very efficiently in effecting polymerization of vinyl compounds, even in dilute mixtures. Part of the sodium in this material can be ion exchanged with concentrated salt solutions at superatmospheric pressure and temperatures of 150–300° C. to introduce other metal ions such as calcium to produce $$[CaO.Al_2O_3.(SiO_2)_2]_{0.7}[Na_2O.Al_2O_3.(SiO_2)_2]_{0.3}$$

having a pore size of about 5 A. This is also a preferred contact material.

Other suitable zeolitic silicates which are effective in the process of this invention include those having compositions corresponding substantially to $$5CaO.12Al_2O_3.30SiO_2$$

with 10 A. pores, and $5Na_2O.6Al_2O_3.15SiO_2$ having 13 A. pores. Certain naturally occurring minerals, such as chabazite, analcite, gmelinite and the like, can be heated to dehydrate the molecule and obtain an activated zeolitic adsorbent similar in properties to the manufactured materials. These natural and synthetic materials are all zeolites and their sodium and calcium and other metal derivatives are very stable crystalline solids which apparently have "pores" in the crystal which are quite uniform in size.

The synthetic crystalline partially dehydrated metallo alumina silicate zeolitic adsorbents are presently available items of commerce marketed by Linde Air Products Company, 30 E. 42nd Street, New York 17, New York, under the name of "Molecular Sieves 4A, 5A, 10X, 13X," etc.

Some adsorbents, particularly silica gel and activated alumina, tend to adsorb rather strongly polar materials to varying degrees. The metallo alumino silicates with larger pores adsorb polar molecules to a similar extent. As indicated above, it is contemplated in this invention to contact the feed stream first with a material which exhibits very strong adsorbptive forces for these polar materials and remove them from the stream to be treated. This pre-adsorption or pretreating of the feed may be accomplished by contacting the feed stream with an inorganic halide such as copper chloride, calcium chloride, magnesium chloride, and the like. In this way large and highly polar materials such as ethers, thio-ethers, water, alcohols, mercaptans, ammonia, and amines are readily removed from the feed. Also removable in this way are the highly polar nitrogen and sulfur compounds which commonly occur in small amounts in hydrocarbon streams. These specifically include such materials as thiophene and the alkylated thiophenes, pyridine and alkylated pyridines. This pretreatment removes these polar materials and prevents them from interfering with the subsequent reactions.

Although the pre-adsorption step prevents rapid deactivation of the main silicate solid beds, some deactivation may eventually occur. It is within the contemplation of this invention to regenerate the silicate by high temperature stripping with a gas, etc. to desorb impurities, or a treatment with hot gas containing oxygen to burn off the impurities as in catalyst regeneration, or both.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. The process for polymerizing styrene which process comprises contacting monomeric styrene with a polymerization catalyst consisting essentially of a synthetic partially dehydrated zeolitic calcium sodium alumino silicate having substantially uniform intracrystalline pores about 5 A. in diameter, said contacting being carried out at a temperature between about 200° F. and about 500° F. and at a pressure below about 100 p.s.i., and thereafter distilling the effluent to recover styrene dimer.

2. The process for polymerizing vinyl chloride which process comprises contacting monomeric vinyl chloride with a polymerization catalyst consisting essentially of a synthetic partially dehydrated zeolitic calcium sodium alumino silicate having substantially uniform intracrystalline pores about 5 A. in diameter, said contacting being carried out at a temperature between about 200° F. and about 500° F. and at a pressure below about 100 p.s.i., and thereafter distilling the effluent to recover vinyl chloride dimer.

References Cited in the file of this patent

UNITED STATES PATENTS

| | | |
|---|---|---|
| 2,227,808 | Dreisbach | Jan. 7, 1941 |
| 2,306,610 | Barrer | Dec. 29, 1942 |
| 2,398,926 | Dorough | Apr. 23, 1946 |
| 2,442,191 | Black | May 25, 1948 |
| 2,487,804 | Hermanson | Nov. 15, 1949 |
| 2,499,796 | Surmatis | Mar. 7, 1950 |
| 2,813,139 | Hutchings | Nov. 12, 1957 |
| 2,818,449 | Christensen | Dec. 31, 1957 |
| 2,850,549 | Bay | Sept. 2, 1958 |
| 3,008,943 | Guyer | Nov. 14, 1961 |

OTHER REFERENCES

Chem. and Eng. News, vol. 32, pages 4786, November 29, 1954.

Barrer: Quarterly Reviews, vol. 3 (1949), pages 293–320.

Barrer: Jour. Soc. Chem. Ind., vol. 64, May 1945, pages 130–135.